US008754000B2

(12) United States Patent
Chan et al.

(10) Patent No.: US 8,754,000 B2
(45) Date of Patent: Jun. 17, 2014

(54) CATALYST FOR HYDROGEN GENERATION FROM SMALL ORGANIC MOLECULES

(75) Inventors: Kwong Yu Chan, Hong Kong (CN);
Shaoan Cheng, Hangzhou (CN); Kwok Ying Tsang, Hong Kong (CN); Siu Wa Ting, Hong Kong (CN); Nicole Kathleen Van Der Laak, Auckland (NZ)

(73) Assignee: The University of Hong Kong, Hong Kong (CN)

( * ) Notice: Subject to any disclaimer, the term of this patent is extended or adjusted under 35 U.S.C. 154(b) by 695 days.

(21) Appl. No.: 12/868,481

(22) Filed: Aug. 25, 2010

(65) Prior Publication Data
US 2011/0059378 A1    Mar. 10, 2011

Related U.S. Application Data (60) Provisional application No. 61/241,296, filed on Sep. 10, 2009.

(51) Int. Cl.
*H01M 8/06*  (2006.01)
*B01J 21/18* (2006.01)
*B01J 23/56* (2006.01)
*C01B 3/22*  (2006.01)

(52) U.S. Cl.
USPC ......... 502/339; 502/185; 429/420; 423/648.1

(58) Field of Classification Search
USPC ................ 502/185, 339; 429/420; 423/648.1
See application file for complete search history.

(56) References Cited

U.S. PATENT DOCUMENTS 4,163,706 A  *  8/1979  Horowitz et al. ............. 204/242

FOREIGN PATENT DOCUMENTS

DE    1 667 224    *  6/1971
EP    1 832 342    *  9/2007    .............. B01J 21/18

OTHER PUBLICATIONS

English Abstract of Talsma (DE 1 667 224) (Jun. 1971).*
Despevroux, B.M., Deller, K., Peldszus, E., "The Use of Precious Metal Catalysts Supported on Activated Carbon in Oxidation Reactions for the Synthesis of Fine Chemicals, especially for the Selective Oxidation of Glucose to Gluconic Acid", New Developments in Selective Oxidation, 1990, pp. 159-161, 163 and 165-168.*
English Machine Translation of Talsma (FR 1 455 237) (Apr. 1966), which is an equivalent of Talsma (DE 1 667 224) (Jun. 1971).*

(Continued)

Primary Examiner — Jessee Roe
(74) Attorney, Agent, or Firm — Saliwanchik, Lloyd & Eisenschenk

(57) ABSTRACT

A catalyst for the generation of hydrogen from a small organic molecule comprises a tertiary metal composition where: the first metal is either Pt or Ru; the second metal is at least one of Pt, Ru, Au, Pd, Rh, Ir, Os, and/or Re; and Bi, primarily present in the form of an oxide or of a mixture of oxides and carbonates and in the +3 oxidation state. A portion of the first and/or second metal may be in the form of an oxide. The catalyst can be in the form of a nanoparticle and supported on an inert substrate, such as carbon. The catalyst can be used for dehydrogenation of formic acid or other small organic molecules in a liquid state at ambient pressures and at temperatures below the boiling point of the liquid. The liquid can be an aqueous solution of the small organic molecule.

5 Claims, 11 Drawing Sheets

A: $Pt_aRu_bBi_cO_x$ on C

B: Trace larger particle was observed

(56) References Cited

OTHER PUBLICATIONS

Ding, J. et al. (2005). Platinum and platinum-ruthenium nanoparticles supported on ordered mesoporous carbon and their electrocatalytic performance for fuel cell reactions. *Electrochimica Acta*, 50: 3131-3141.

Fukuzumi, S. et al. (2008). Efficient Catalytic Decomposition of Formic Acid for the Selective Generation of $H_2$ and H/D Exchange with a Water-Soluble Rhodium Complex in Aqueous Solution. *ChemSusChem*, 1: 827-834.

Khan, M. M. T. et al. (1988). Oxidative Addition of Water to the $Ru^{II}$ Catalyst $K[Ru^{II}(Hedta)(CO)]$: Homogenous Catalysis of the Water-Gas Shift Reaction under Ambient Conditions. *Angewandte Chemie International Edition in English*, 27(12): 1735-1736.

Wang, Y. et al. (2000). Preparation of Tractable Platinum, Rhodium, and Ruthenium Nanoclusters with Small Particle Size in Organic Media. *Chemistry of Materials*, 12(6):1622-1627.

* cited by examiner

FIG. 4 inset: enlarged section
A: Pt/Ru nanoparticle          B: Pt/Ru/Bi$_2$O$_3$ on C inset: electron diffraction showing a fcc structure
C: HRTEM of Pt/Ru/Bi$_2$O$_3$ on C

FIG. 5

A: $Bi_2O_3$ nanoparticle on C

A: $Pt_aRu_bBi_cO_x$ on C

B: Trace larger particle was observed

A: Large area of $Pt_aRu_bBi_cO_x$ on C  B: Uniform size $Pt_aRu_bBi_cO_x$ particle on C

CATALYST FOR HYDROGEN GENERATION FROM SMALL ORGANIC MOLECULES

CROSS-REFERENCE TO RELATED APPLICATION

The subject application claims the benefit of U.S. Provisional Application Ser. No. 61/241,296, filed Sep. 10, 2009, which is incorporated herein by reference in its entirety.

BACKGROUND OF THE INVENTION

Hydrogen sources for various energy applications, particularly those for "clean" transportation uses, are under development where electric power is impractical as a substitute for those powered by fossil fuels. There is also a strong desire for a portable power source that can perform better than conventional batteries in current consumer devices. Fuel cells are a potential alternative portable power sources that have generated considerable interest because they can: deliver a relatively high energy density; be rapidly refueled; and be used in an "environmental friendly" manner.

Hydrogen generation is commonly carried out by the water-gas-shift (WGS) reaction where carbon monoxide and water are reacted as in Equation 1.

$$CO + H_2O \rightarrow H_2 + CO_2 \quad (1)$$

The WGS reaction is used extensively for coal gasification and fuel reforming and takes place at temperatures of 200-500° C. over a catalyst comprising iron, chromium, nickel, copper, zinc oxide and others metals or oxides. Low temperature WGS reactions are desired and have been suggested in Khan et al., *Angew. Chem. Int. Ed. Engl.* 27 (1988) 12, 1735-6, which discloses a liquid phase CO hydration process. The two-step low temperature WGS reaction involves carbon monoxide hydration using a soluble catalyst in an aqueous phase, Equation 2, to form an intermediate that can subsequently generate hydrogen in a second step, Equation 3, using a heterogeneous catalyst.

$$CO + H_2O \rightarrow \text{intermediate} \quad (2)$$

$$\text{Intermediate} \rightarrow H_2 + CO_2 \quad (3)$$

By employing appropriate catalysts, the net WGS reaction can occur at temperature below 100° C. that results in an energy savings and allows fueling of indirect fuel cells where the intermediate can be an organic liquid. The two step process, Equations 2 and 3, also allows the purification of a CO containing hydrogen source.

Significant research and development has focused on fuel cells powered by organic liquids of low molecular weight, with methanol being the most widely investigated. The power density attained by a methanol fuel cell is about $60 \, \text{mWcm}^{-2}$, which is an order of magnitude lower than that attainable in a hydrogen fuel cell. Additionally, the permeability of polymer electrolyte membranes to methanol allows methanol diffusion to the cathode, which significantly reduces the voltage and efficiency of a low temperature fuel cell so constructed.

Although very high power densities can be generated in fuel cells powered by pure hydrogen, hydrogen has disadvantages with regard to the cost for its generation and its ease of storage. For example, the weight of a metal hydrogen storage tank is typically more than 20 times the weight of the compressed hydrogen that it can store. An alternative approach to hydrogen storage is "chemical storage" where hydrogen is generated in-situ from a chemical that is stored at ambient pressure.

Chemical storage can circumvent the difficulties of generating and storing hydrogen by liberating hydrogen from organic liquids such as methanol or formic acid. Hydrogen fuel cells employing this in-situ hydrogen generation are referred to as indirect fuel cells. Although generation of hydrogen from small organic molecules requires additional equipment and imposes several addition steps, progress has been slowed due to the unfortunate requirement of reforming catalysts that function only at very elevated temperatures. Nevertheless, a miniature micro-channel reactor for hydrogen generation from methanol and a miniature steam reformation reactor that operates at 190 to 290° C. have been developed. An additional impediment to the development of such fuel cells is that almost all existing catalysts for such devices generate some carbon monoxide (CO) as a by-product, which can poison the fuel cell when present at even minute levels. Development of catalysts that are not poisoned by CO is not the most attractive alternative for consumer or other portable devices. Rather, a catalyst that does not generate toxic CO is desired. Hence there remains a need for a catalytic material or system that can generate hydrogen from small organic molecules at lower temperatures and ambient pressures without generation of CO for the construction of indirect hydrogen fuel cells that power zero emission vehicles or portable consumer devices.

BRIEF SUMMARY OF THE INVENTION

An embodiment of the invention is directed to catalysts for the dehydrogenation of a small organic molecule in a liquid state where the catalysts have a first metal comprising Pt or Ru; at least one second metal comprising Pt, Ru, Au, Pd, Rh, Ir, Os, and/or Re; and a third metal Bi that is primarily in the form of an oxide but can be present as a mixture of oxides and carbonates. The first and second metals can have a portion of the metal in the form of an oxide. The Bi is predominately in the +3 oxidation state. In one embodiment, the first metal is Pt and the second metal is Ru. Effective dehydrogenation catalysts can have the formula $Pt_aRu_bBi_cO_x$ where a is 0.3 to 6.5, b is 1, c is 0.1 to 6.4, and x is 0.15 to 9.6. The catalyst can be readily generated as nanoparticles that can be decorated on a supporting material to present a large surface area for conduct of a heterogeneous dehydrogenation reaction. The supporting material can be carbon, titania, alumina, silica, or any other appropriate inert material. Carbon supports can be activated carbon, carbon black, synthetic mesoporous carbons, or carbon nanotubes. Similarly, titania, alumina, and silica can be of various morphologies including, for example, mesoporous titania nanofibers, titania nanotubes, and alumina nanotube arrays.

Other embodiments of the invention are directed to employing these dehydrogenation catalysts to form $H_2$ by contacting them with a small organic molecule in the liquid state. The liquid state can be a neat liquid or a solution, even an aqueous solution. The catalyst is insoluble in the liquid and can be used in a fixed bed reactor. The small organic molecule can be formic acid, methanol, acetic acid, ethyl formate, formaldehyde or any other small molecule capable of being dehydrogenated. For example, formic acid can be dehydrogenated to $H_2$ and $CO_2$, and the formic acid can be an aqueous solution or a solution in another solvent, such as alcohols. Formic acid can be from any source including an intermediate in the water gas shift reaction. When used in a fixed bed reactor the liquid can be continuously fed to the catalyst within the reactor for continuous generation of $H_2$. This allows the use of this method in portable devices at ambient pressures and temperatures below the boiling points of the liquid containing the small molecule that is to be dehydrogenated.

According to an embodiment of the invention, a fixed bed reactor of the catalyst can be coupled to a hydrogen fuel cell to generate electrical power from hydrogen where the hydrogen is stored as a small organic molecule. By generating $H_2$ and $CO_2$ from an organic molecule such as formic acid, hydrogen, which can be separated from the $CO_2$, can be used as the fuel for the fuel cell.

A catalyst according to an embodiment of the invention allows the generation of $H_2$ at ambient temperature and pressure although the catalyst can also be used at elevated temperatures and pressures, and can be employed in the performance of the WGS reaction where high pressure is needed to achieve sufficient solubility of CO in a aqueous vehicle. Catalysts according to embodiments of the invention can be used in two-step or one-step WGS reactions.

DETAILED DESCRIPTION OF THE INVENTION

Embodiments of the invention are directed to mixed metal catalysts and their use in a method to generate hydrogen (dehydrogenation) from a small organic molecule, for example formic acid. The mixed metal catalyst comprises a ternary metallic composite comprising at least one of platinum (Pt) and ruthenium (Ru) and the third component comprising bismuth (Bi) as an oxide or as a mixture of oxides and carbonates, wherein some of at least one of the other metals is present as an oxide of the metal. The tertiary metal composite can include in place of either the Pt or Ru, or in addition to the Pt and Ru, one or more of gold (Au), palladium (Pd), rhodium (Rh), iridium (Ir), Osmium (Os), and/or rhenium (Re). The proportions of the metals can vary over a wide range, for example the Bi can be present either at low (dopant) levels, for example 0.03 atomic percent of the metals, or can be present in excess of the other metals.

In some embodiments of the invention the catalyst comprises $Pt_aRu_bBi_cO_x$ where a, b, c, and x can vary over a large range. For example where b is 1, a is 0.3 to 6.5, c is 0.1 to 6.4, and x is 0.15 to 9.6. In one embodiment of the invention the catalyst is in the form of nanoparticles that are supported. The employment of nanoparticulate catalyst permits a high surface area of active sites that contact the organic molecule precursor to the $H_2$. Any material that is inert to the catalytic composition, the organic molecule, and the catalyst in the presence of the organic molecule can be used, for example carbon, titania, alumina, or silica. In one embodiment of the invention, the support material can be carbon having a high surface area, for example a activated carbon, such as Vulcan XC-72®, or carbon nanotubes, for example, multiwall carbon nanotubes or singlewall carbon nanotubes.

Catalysts according to some embodiments of the invention are insoluble nanoparticles. The nanoparticles can be from 2 nm to 100 nm in cross-section, for example about 5 nm in cross-section. The nanoparticles can have a narrow or a broad distribution of sizes. The particulate catalyst can be easily and securely absorbed on a support, such as carbon, and stable to air, making the catalysts according to embodiments of the invention useful in flow through packed bed reactors. The catalysts require no organic ligands, are air stable, and exhibit good activity at temperatures from 20° C. to 80° C. or more, where, in general, they can be used at ambient pressures and, therefore, permit the use of small organic molecules, optionally in a solvent such as water, at temperatures below the boiling points of the liquids.

In embodiments of the invention, dehydrogenation of the organic molecule is carried out in the liquid state to generate hydrogen ($H_2$) and carbon dioxide ($CO_2$) without generation of carbon monoxide (CO). The reaction can be carried out in the presence of water, and the $H_2$ and $CO_2$ can be readily separated from the liquid portion of the reaction mixture and fed into a fuel cell where the hydrogen and oxygen ($O_2$) from air is converted into water with the generation of electricity. In some embodiments of the invention, formic acid can be converted into $H_2$ and $CO_2$ where the formic acid can be introduced as a neat liquid or an aqueous solution.

Figure 1:
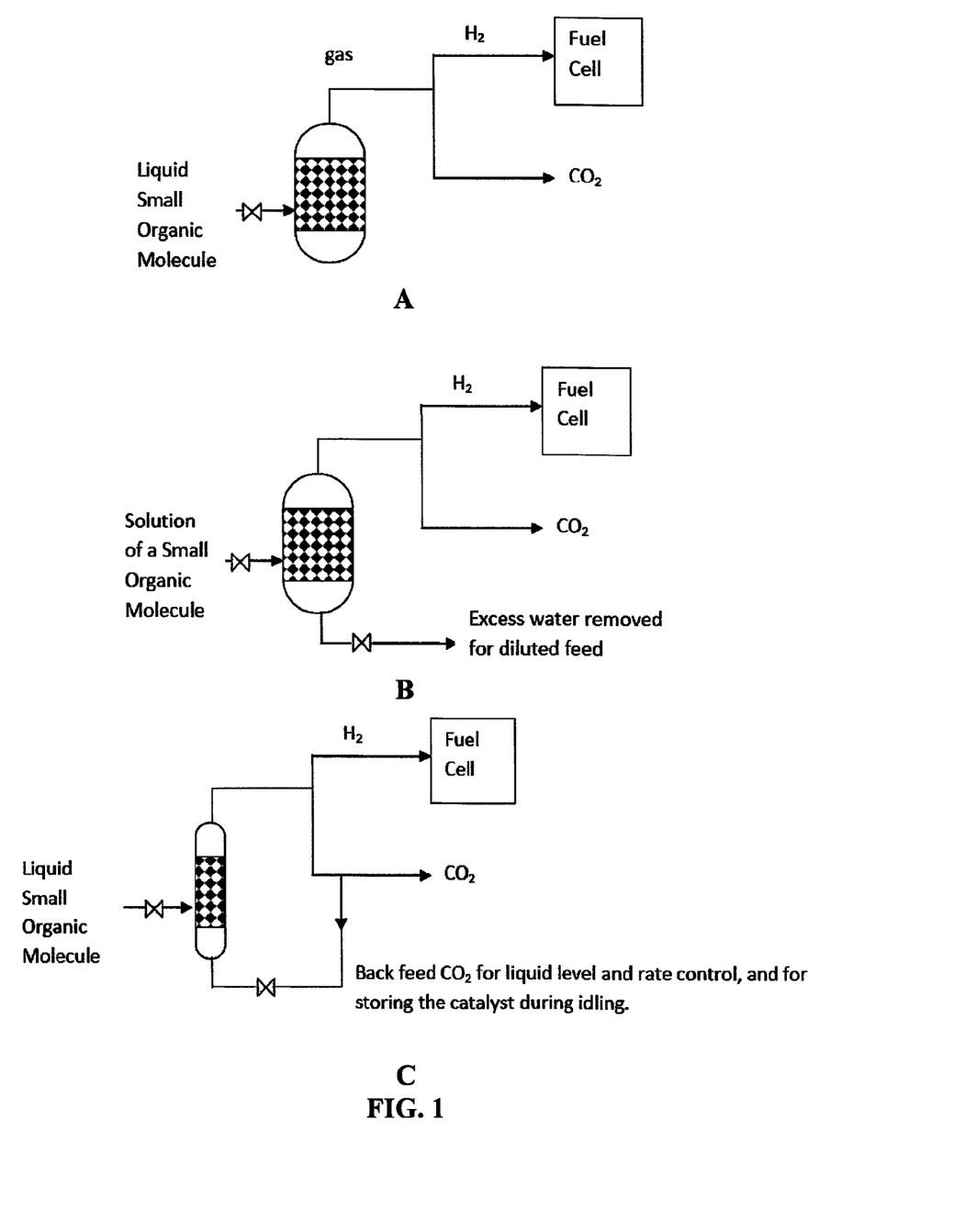
FIG. 1 illustrated three configurations for a system for generating $H_2$ according to embodiments of the invention where: a) is a simple feed system for use with a neat small organic molecule feed source; b) is a simple feed system for use with an aqueous small organic molecule feed source; and c) displays a back feed system where $CO_2$ is returned to a catalyst bed portion of the reactor to augment the rate of gas production by use of the $CO_2$ in the catalyst bed.

Pure formic acid is highly corrosive and fuming. Commonly available formic acid contains a small amount of water, for example 5%, for stability. The method of producing hydrogen from formic acid or other small organic molecules is illustrated in FIG. 1 for three configurations of a fixed bed reactor according to embodiments of the invention that can accommodate, for example, formic acid in neat or diluted form. In FIG. 1a, a neat small organic molecule is contacted with the catalyst in a catalyst reservoir as a liquid feed in a continuous or on-demand manner where separation, as needed, can be carried out using any appropriate method including a membrane separation. In FIG. 1b, a feed that is diluted in water is illustrated where the water is drained from the catalyst reservoir in a controlled manner to allow a continuous flow reaction. In FIG. 1c the separated exhaust carbon dioxide can be back fed into the bottom of a tube reactor to control the liquid level in the reactor, to control the rate of gas generation or to insulate the catalyst bed during a period of shut down or idling.

Figure 2:
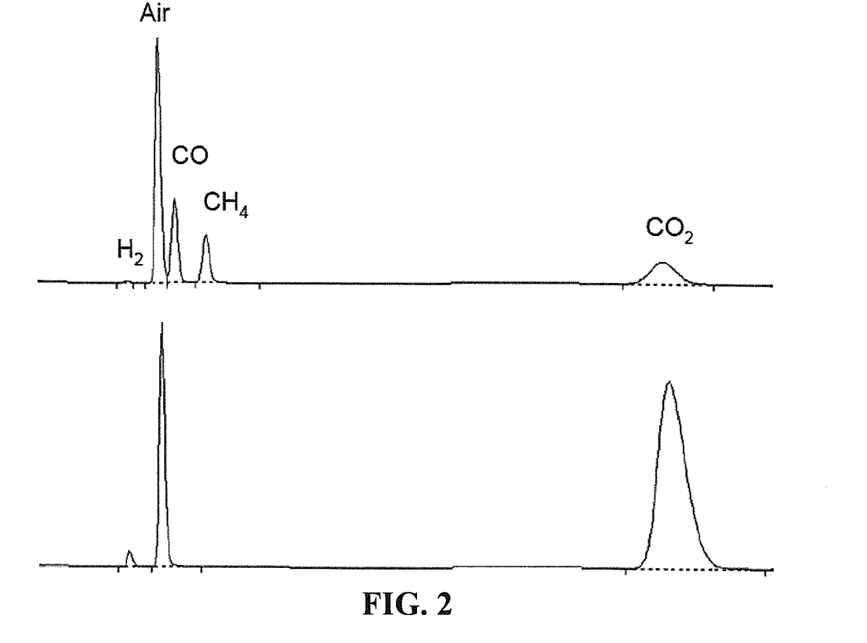
FIG. 2 shows gas chromatography traces for (top) a reference standard and (bottom) the gas generated using a catalyst according to embodiments of the invention.
Figure 3:
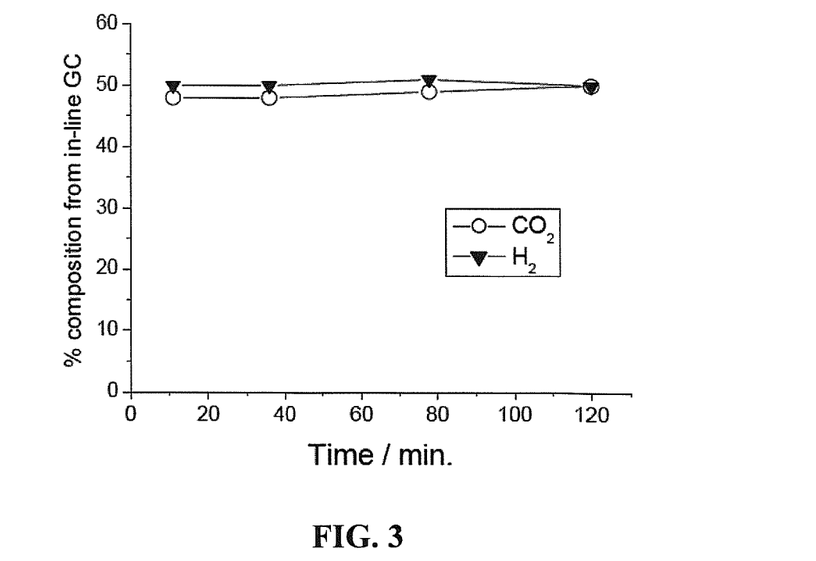
FIG. 3 is a plot of the compositions of gas generated over time by a catalyst according to an embodiment of the invention.

As illustrated in FIG. 2, hydrogen generation at 80° C. from 80 mL of 15 v/v formic acid using 400 mg of 35% $Pt_2RuBi_4O_6$ supported on Vulcan XC-72® carbon occurs with the clean conversion of formic acid to $H_2$ and $CO_2$ without generation of any apparent CO as determined by gas chromatographic analysis relative to a standard mixture containing $H_2$, $CH_4$, air, $CO_2$ and CO. The mixture formed was 50% $CO_2$ and 50% $H_2$ by gas chromatographic analysis. The selectivity of the catalyst towards dehydrogenation over dehydration is illustrated in FIG. 3 for hydrogen generation over a two hour period using the 15% v/v formic acid in water over 35% $Pt_2RuBi_4O_6$ supported on Vulcan XC-72® carbon. The conversion of formic acid to $H_2$ is greater than 99% in 2 hours under these conditions.

Figure 4:
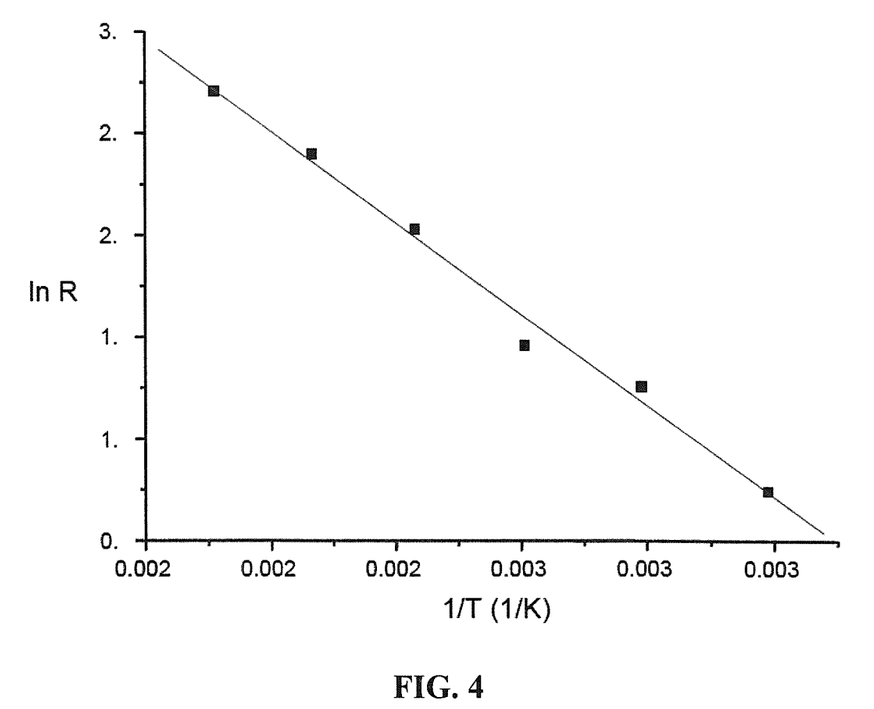
FIG. 4 is an Arrhenius plot for the initial rates of dehydrogenation of a formic acid solution using a catalyst according to an embodiment of the invention.

An Arrhenius plot over the temperature range of 30 to 80° C. is shown in FIG. 4 for the first order decomposition of formic acid (initial rates) from 15% v/v formic acid in water over 35% $Pt_2RuBi_4O_6$ supported on Vulcan XC-72® carbon. The activation energy was determined to be 37.3 kJ/mol from this plot. This value is significantly lower than prior art values for dehydrogenation of formic acid using other catalysts. For example, Fukuzimi et al., *Chem. Sus. Chem.* 2008, 1, 827 reported an activation energy of 86.9 kJ/mol for an optimized soluble Rh complex catalyst. The catalysts according to embodiments of the invention effectively operate at ambient pressures under ambient atmospheric conditions. Catalysts according to embodiments of the invention are not air sensitive and have long shelf-lives and operation life-times. The catalysts according to embodiments of the invention are useful for packed bed reactors where organic molecule solutions can be passed through the immobilized supported catalyst. The catalysts have advantages over reported soluble homogeneous catalysts that show high turnover (moles of hydrogen generated per moles of catalysts per unit time). Many state of the art homogeneous catalysts are air sensitive and have a limited shelf-life. The homogeneous catalysts also require the use of amines in the reactor and subsequent removal of the amines from the gas produced. In general, the homogeneous catalysts are present in low concentration due to their limited solubility, hence limiting the volume efficiency of a reactor. Additionally, the homogeneous reaction cannot be stopped once catalyst and fuel are contacted in the aqueous solution. A heterogeneous reaction using a catalyst according to an embodiment of the invention allows stoppage of the reaction by separation of the solid catalyst from the solution. Removal of excess water and impurities in the formic acid feed is another difficulty in a homogeneous system that is easily performed with a heterogeneous catalyst according to embodiments of the invention.

Materials and Methods

Example 1

Figure 5:
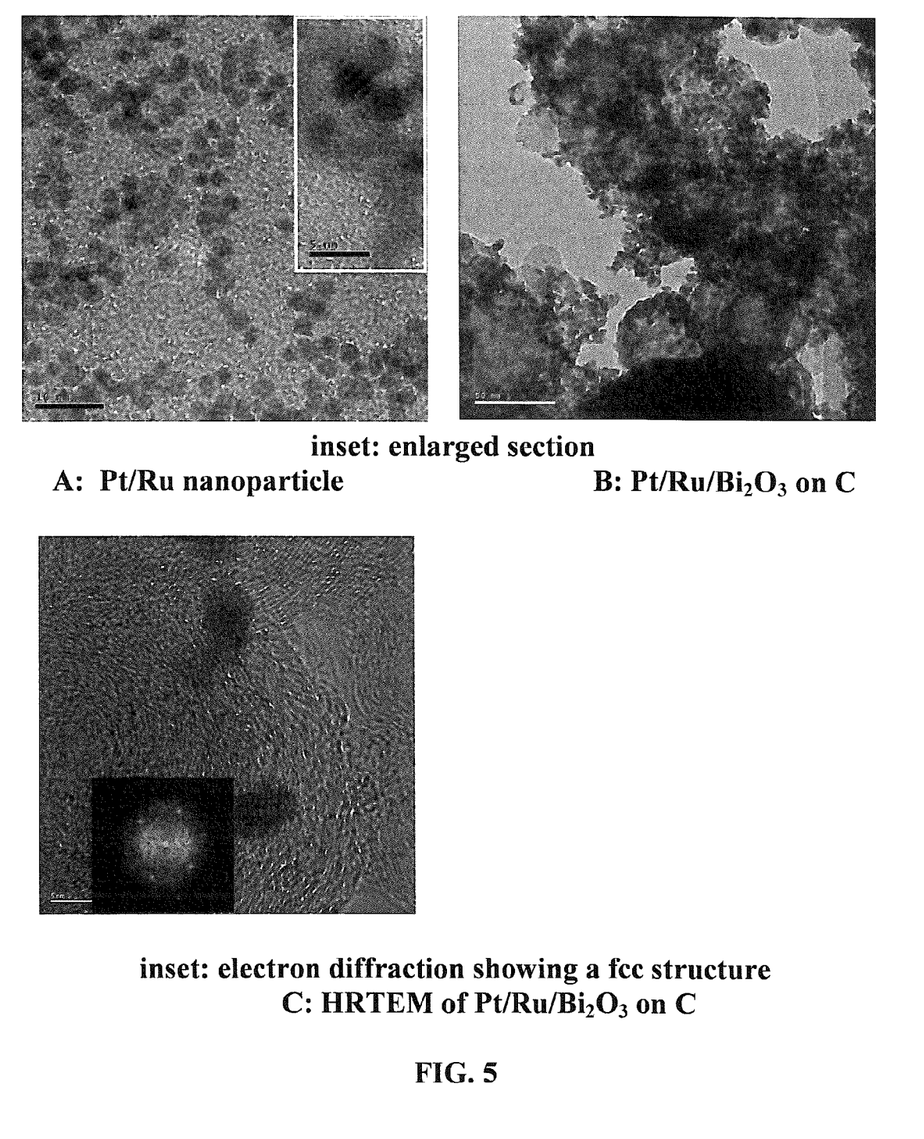
FIG. 5 shows transmission electron micrographs of a catalyst according to an embodiment of the invention.

A colloidal Pt/Ru was prepared as disclosed in Wang et al., *Chemistry of Materials* 2000, 12, 1622 and Ding et al., *Electrochimica Acta*, 2005, 50 3131-41. A glycol solution of $H_2PtCl_6.6H_2O$ and $RuCl_3$ was added to 0.25M NaOH in ethylene glycol followed by heating at 160° C. for 3 hr, with nitrogen passing through the reaction mixture. A clear dark-brown homogeneous colloidal solution of Pt/Ru metal nano-clusters resulted with no apparent precipitate. FIG. 5a shows a typical TEM image of Pt/Ru nanoparticles with a uniform size distribution. Commercially available 10 micrometer sized $Bi_2O_3$ powder from Aldrich Co. was as added to the colloidal solution and the solution stirred for 24 hr. Vulcan XC 72® carbon or titanium dioxide powder was added to the solution and stirred for another 24 hr. The $Pt_aRu_bBi_cO_x$ loaded on carbon powder was collected by centrifugation and washed twice with water and dried at 60° C. FIG. 5b shows a transmission electron microscopy (TEM) image of the supported catalyst. HRTEM image of a few nanoparticles of the end product and its electron diffraction (ED) pattern exhibited a face centered cubic (fcc) structure. The Pt/Ru nanoparticle was supported on carbon and physically attached to the large $Bi_2O_3$ particles. Table 1, below, shows the initial compositions of metals in the precursor and the composition as determined by SEM-EDX analyses of the synthesized $Pt_aRu_bBi_cO_x$ particles loaded on carbon powder or titania.

TABLE 1

Compositions of metals in sample catalysts prepared in Examples 1-4 on carbon except where noted, expressed in initial metal ratios, metal atom fractions, and EDX analyzed fractions where the atom fractions are of the metals only (excluding oxygen)

| | Metal Ratio in Precursor | | | Metal Atom Fraction in Precursor | | | Analytical Method | Atom Fraction by Metal Analysis | | |
|---|---|---|---|---|---|---|---|---|---|---|
| | Pt | Ru | Bi | Pt | Ru | Bi | | Pt | Ru | Bi |
| Ex 1a | 2 | 1 | 4.4 | 0.270 | 0.135 | 0.595 | SEM | 0.381 | 0.159 | 0.460 |
| Ex 1b* | 2 | 1 | 4.4 | 0.270 | 0.135 | 0.595 | SEM | 0.363 | 0.125 | 0.513 |
| Ex 2a | 1 | 1 | 3 | 0.200 | 0.200 | 0.600 | SEM | 0.223 | 0.106 | 0.670 |
| Ex 2b | 2 | 1 | 3 | 0.333 | 0.167 | 0.500 | SEM | 0.387 | 0.090 | 0.523 |
| Ex 2c | 3 | 1 | 3 | 0.429 | 0.143 | 0.429 | SEM | 0.707 | 0.109 | 0.185 |

TABLE 1-continued

Compositions of metals in sample catalysts prepared in Examples 1-4 on carbon except where noted, expressed in initial metal ratios, metal atom fractions, and EDX analyzed fractions where the atom fractions are of the metals only (excluding oxygen)

| | Metal Ratio in Precursor | | | Metal Atom Fraction in Precursor | | | Analytical Method | Atom Fraction by Metal Analysis | | |
|---|---|---|---|---|---|---|---|---|---|---|
| | Pt | Ru | Bi | Pt | Ru | Bi | | Pt | Ru | Bi |
| Ex 2d | 4 | 1 | 3 | 0.500 | 0.125 | 0.375 | SEM | 0.438 | 0.208 | 0.354 |
| Ex 2e | 2 | 1 | 3 | 0.333 | 0.167 | 0.500 | SEM | 0.343 | 0.149 | 0.507 |
| Ex 3a | 1 | 1 | 0.5 | 0.400 | 0.400 | 0.200 | TEM | 0.519 | 0.296 | 0.185 |
| Ex 3b | 3 | 1 | 1 | 0.600 | 0.200 | 0.200 | TEM | 0.682 | 0.159 | 0.159 |
| Ex 3c | 2 | 1 | 1 | 0.500 | 0.250 | 0.250 | TEM | 0.345 | 0.483 | 0.172 |
| Ex 3d | 1 | 3 | 1 | 0.200 | 0.600 | 0.200 | TEM | 0.226 | 0.566 | 0.208 |
| Ex 3e | 1 | 2 | 1 | 0.250 | 0.500 | 0.250 | TEM | 0.353 | 0.392 | 0.255 |
| Ex 3f | 2 | 1 | 4 | 0.286 | 0.143 | 0.571 | TEM | | | |
| Ex 3g | 1 | 0.8 | 0.1 | 0.538 | 0.430 | 0.032 | TEM | | | |
| Ex 4a | 1 | 3 | 1 | 0.200 | 0.600 | 0.200 | TEM | 0.111 | 0.611 | 0.278 |

*on TiO$_2$ support

Example 2

Figure 6:
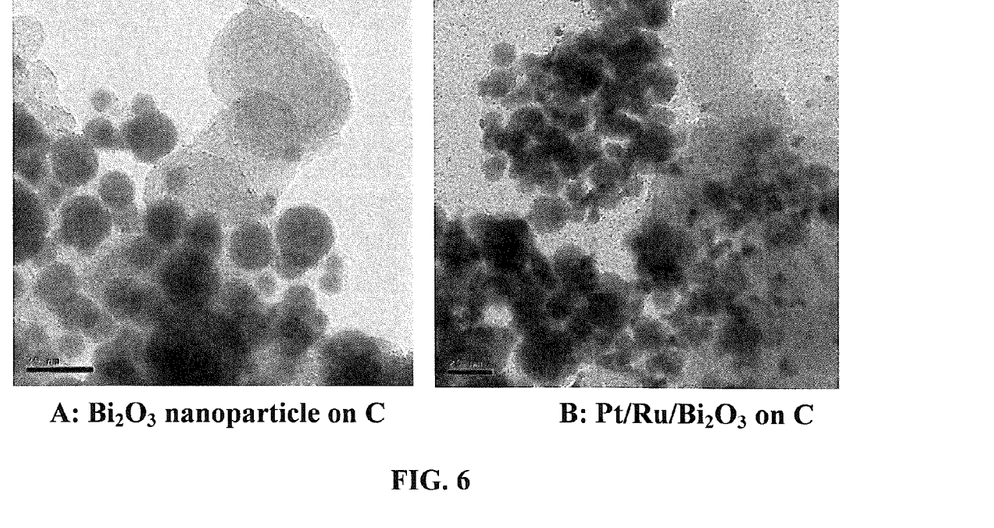
FIG. 6 shows transmission electron micrographs of a catalyst according to an embodiment of the invention.

Two grams of Bi(NO$_3$)$_3$.5H$_2$O was dissolved in nitric acid and combined with Vulcan XC-72® carbon. A 25 mL volume of 0.5M citric acid was added to the suspension. The combined mixture was heated in an oil bath at 100° C. until all the water was evaporated leaving a black powder. The powder was sintered at 400° C. under argon. Bi$_2$O$_3$ nanoparticles loaded on carbon powder were obtained. FIG. 6a shows a typical TEM image of Bi$_2$O$_3$ nanoparticles loaded on carbon. Colloidal Pt/Ru was prepared as above in Example 1. The prepared Bi$_2$O$_3$ on C was added to the Pt/Ru colloidal suspension and the mixture stirred for 24 hr. The Pt$_a$Ru$_b$Bi$_c$O$_x$ loaded on carbon powder was collected by centrifugation, washed twice with water, and dried at 60° C. FIG. 6b shows a typical TEM image of the obtained catalyst. Table 1, above, shows the initial compositions of metals in the precursor and the SEM-EDX analyses of synthesized Pt$_a$Ru$_b$Bi$_c$O$_x$ loaded with carbon powder having different Pt contents.

Example 3

Figure 7:
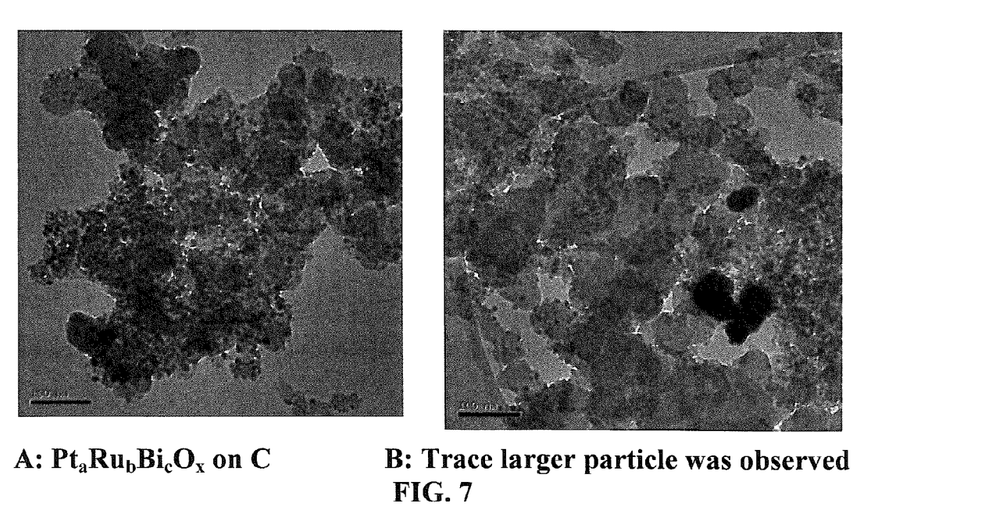
FIG. 7 shows transmission electron micrographs of a catalyst according to an embodiment of the invention.
Figure 8:
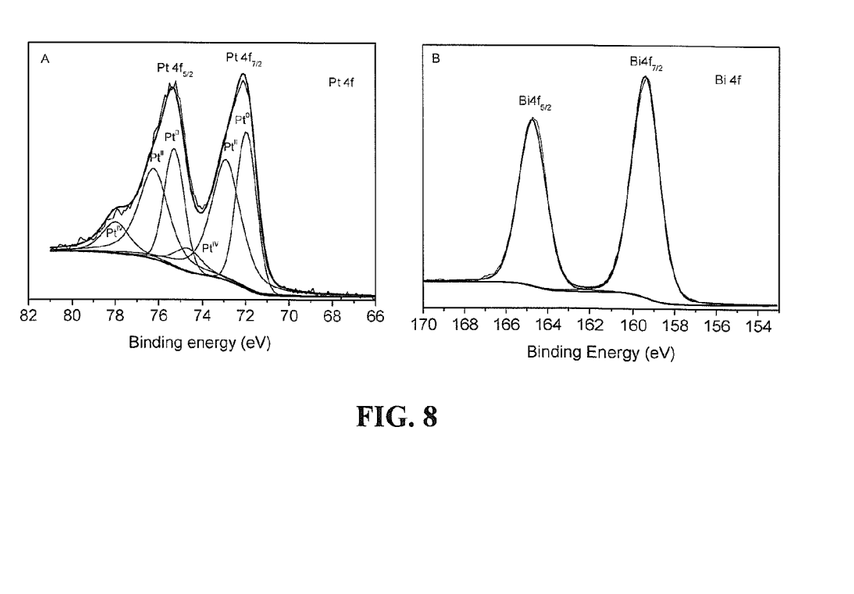
FIG. 8 shows XPS spectra of a) Pt peaks and b) Bi peaks observed for a catalyst according to an embodiment of the invention.

Bi(NO$_3$)$_3$.5H$_2$O was dissolved in nitric acid. H$_2$PtCl$_6$.6H$_2$O and RuCl$_3$ were dissolved into separate portions of water. The three metals solutions were mixed in varied proportions to vary the composition of end products to which citric acid was added to each composition. The solutions were stirred for 1 hour. Vulcan XC-72® carbon was added and each mixture followed by stirring for 24 hours. Mixtures were heated in an oil bath at 100° C. until water was evaporated resulting in a black powder. The powders were sintered at 850° C. under argon. FIGS. 7a and 7b shows the TEM images of end products. A HRTEM of one nanoparticle indicated a definite lattice where the electron diffraction pattern was consistent with an hcp structure. Table 1, above, gives the initial compositions of metals in the precursor suspensions with TEM-EDX analysis results for the synthesized Pt$_a$Ru$_b$Bi$_c$O$_x$ loaded with carbon powder for the different metal ratios. The oxidation states of the metals were analyzed by XPS analyses. FIG. 8a shows the typical XPS spectra for the binding energies of Pt. Two peaks with binding energies of 71.49 eV and 74.82 eV, 72.43 eV and 75.76 eV, 74.19 eV and 77.52 eV correspond to Pt 4f$_{7/2}$ of Pt$^o$, Pt$^{II}$ and Pt$^{IV}$ and Pt 4f$_{5/2}$ states of Pt$^o$, Pt$^{II}$ and Pt$^{IV}$, respectively. FIG. 8b shows the bismuth section of the XPS spectrum. The doublet can be resolved clearly into two peaks with binding energies at 158.95 eV for Bi 4f$_{7/2}$ and 164.26 eV for Bi 4f$_{5/2}$. These peaks are consistent with a +3 oxidation state of bismuth.

Example 4

Figure 9:
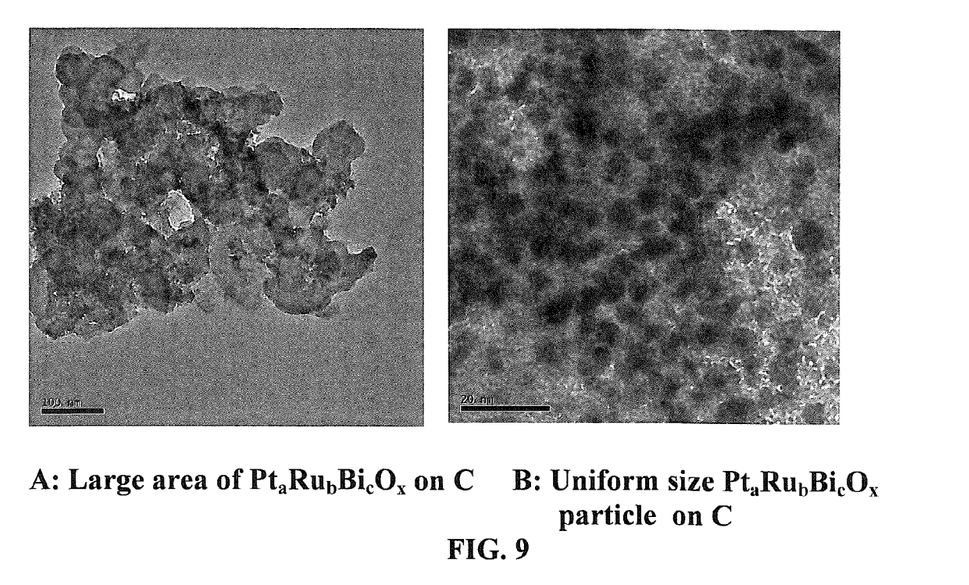
FIG. 9 shows transmission electron micrographs of a catalyst according to an embodiment of the invention.

Catalyst was prepared as same manner as Example 3 with the exception that citric acid was replaced with the equivalent moles of ammonium citrate tribasic. By changing the protecting agent, a more uniform size distribution of ternary metals nanoparticle was formed, as can be seem in the TEM images in FIGS. 9a and 9b. Table 1, above, gives the initial compositions of metals in the precursors and the TEM-EDX analyses of the synthesized Pt$_a$Ru$_b$Bi$_c$O$_x$ nanoparticles loaded on carbon powder.

Figure 10:
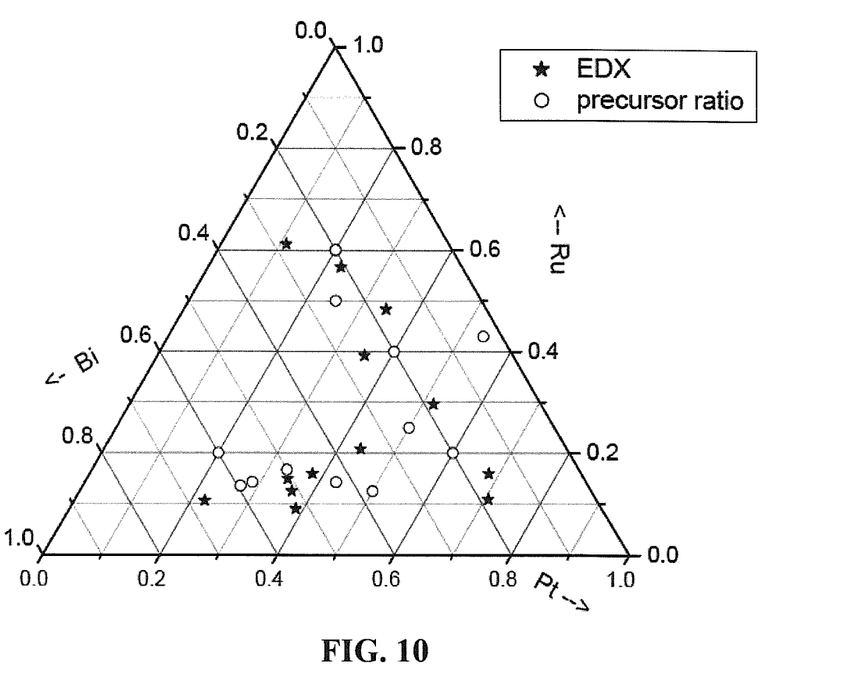
FIG. 10 is a ternary diagram for the metals of various catalysts according to embodiments of the invention.

Hydrogen Generation Rate:

A typical performance test of the catalyst involved: A room temperature, 40° C., or 80° C. premixed formic acid solution was added to a stoppered Erlenmeyer flask containing the weighed catalyst, where 80 mL of a 15% v/v formic acid in water was used in most experiments. The flask was immersed into a water bath to maintain a constant reaction temperature. The amount of gas librated was measured using a gas burette. The resulting gas composition was determined using a gas chromatograph (GC) equipped with a thermal conductivity detector (TCD). A typical chromatogram of a standard gas mixture (upper panel) and product gases (lower panel) is shown in FIG. 2. Activity of the various catalysts prepared in Examples 1-4 towards hydrogen generation from 80 mL formic acid per 400 mg of catalyst is shown in Table 2, below. The compositions of Table 1, above, are summarized in a ternary phase diagram of FIG. 10. The oxygen is mostly associated with bismuth in the form of Bi$_2$O$_3$ as in the starting commercial powder of Example 1 and as indicated by the XPS analysis shown in FIG. 8 for a sample prepared as disclosed above in Example 3. Some ruthenium and platinum may be present in the form of oxides, as shown for Pt in FIG. 8 for a sample prepared as in Example 3.

TABLE 2

Activity of catalysts prepared in Examples 1-4 for dehydrogenation of 80 mL of a 15% v/v formic acid solution over 400 mg of catalyst.

| Sample | Metal Ratio in Precursor | | | Initial Rate in mL gas/min. | Temperature °C. |
|---|---|---|---|---|---|
| | Pt | Ru | Bi | | |
| Ex 1a | 2 | 1 | 4.4 | 16 | 80 |
| Ex 1b | 2 | 1 | 4.4 | 7.6 | 80 |
| Ex 2a | 1 | 1 | 3 | 3.2 | 40 |
| Ex 2b | 2 | 1 | 3 | 8.5 | 40 |
| Ex 2c | 3 | 1 | 3 | 8.6 | 40 |
| Ex 2d | 4 | 1 | 3 | 4.6 | 40 |
| Ex 2e | 2 | 1 | 3 | | |
| Ex 3a | 1 | 1 | 0.5 | 15.8 | 80 |
| Ex 3b | 3 | 1 | 1 | 60 | 80 |
| Ex 3c | 2 | 1 | 1 | 21 | 80 |
| Ex 3d | 1 | 3 | 1 | 69.8 | 80 |
| Ex 3e | 1 | 2 | 1 | 15 | 80 |
| Ex 3f | 2 | 1 | 4 | 26.3 | 80 |
| Ex 3g | 1 | 0.8 | 0.1 | 29.5 | 80 |
| Ex 4a | 1 | 3 | 1 | 120 | 80 |

Figure 11:
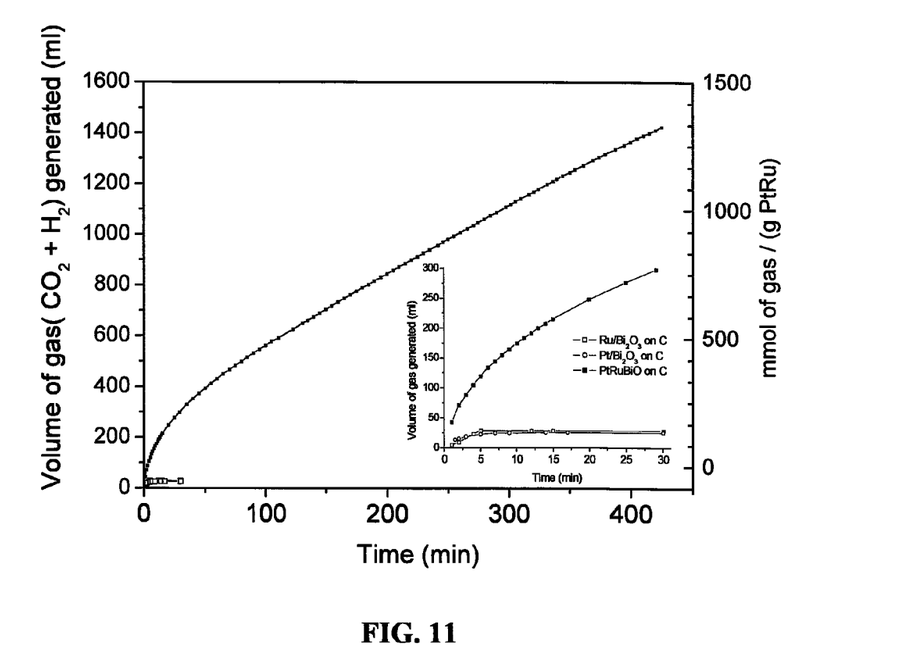
FIG. 11 is a plot of the decomposition of formic acid over a $Pt_2RuBi_4O_6$ on carbon catalyst at 80° C. over time according to an embodiment of the invention, where the comparative inactivity of the binary oxide complexes $PtBi_2O_3$ and $RuBi_2O_3$ on carbon is plotted in the insert.

Gas evolved in 7 hours from 80 mL of 15% v/v formic acid solution per 400 mg in water immersed with 400 mg of $Pt_2RuBi_4O_6$ on C catalyst of 30% metal loaded carbon is shown in FIG. 11. Varying degrees of reactivity, 57% to 265%, to that illustrated in FIG. 11 are found for various other compositions of the $Pt_aRu_bBi_cO_x$ catalyst. Bismuth oxide is not simply acting as a support. No activity was found for PtRu supported on carbon, titania, or alumina. Bismuth oxide plays a significant role in ambient temperature reactions as indicated by control experiments using single metals of Pt, Ru, Bi, their oxides, their binary metal mixtures, and their binary metal oxides. No activity was observed in these cases with the exception of $Pt_aBi_cO_x$ and $Ru_bBi_cO_x$ for which relatively low activity was observed, being only a small fraction of the activity observed for the tertiary metal mixture, as illustrated in the FIG. 11 insert. The oxidation state of bismuth in all compounds was determined to be exclusively +3 by XPS, whereas only small fractions of Pt and Ru are present in a non-zero oxidation state.

Figure 12:
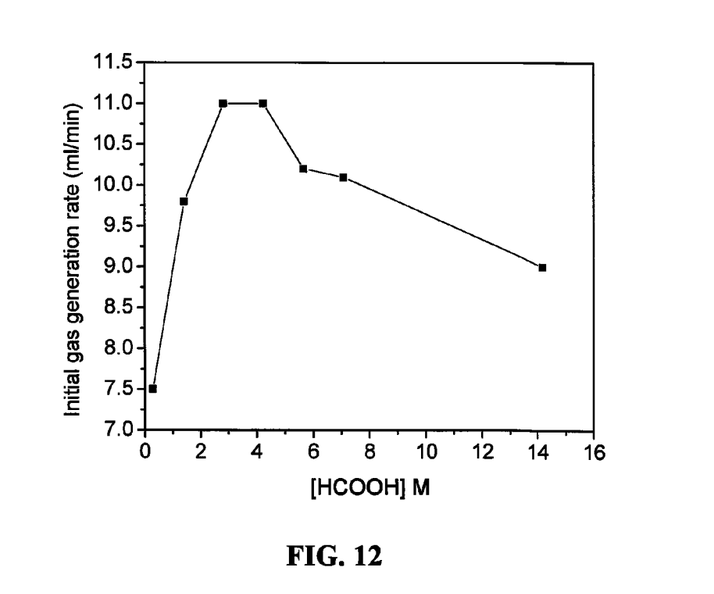
FIG. 12 is a plot of the initial rate of formic acid decomposition for $Pt_2RuBi_4O_6$ on carbon catalyst at 80° C. as a function of formic acid concentration according to an embodiment of the invention.

The dehydrogenation reaction rate is sensitive to the concentration of formic acid in water with a maximum rate being observed at about 15% v/v or 4 M formic acid in water, as illustrated in FIG. 12. Concentrations of molecular formic acid and formate ion change interactively with concentration in the formic acid/water mixture. Using $Pt_aRu_bBi_cO_x$ catalysts, decomposition rate linearly depends on formic acid concentration when there is an excess of formate ion over formic acid. Rates were also observed to be linearly dependent on formate ion concentrations when formic acid is in excess of formate ion. Although not to be bound by a mechanism, the reaction appears to be bimolecular in nature and depends on both the HCOOH and formate ion concentrations. High selectivities and high rates may be due to synergistic roles of platinum, ruthenium, and bismuth oxide in cleaving C—H bond, minimizing CO adsorption (or oxidizing CO), and facilitating the generation and removal of $CO_2$. Bismuth oxide appears to offer a unique role in lowering the activation energy and offering high selectivity to dehydrogenation.

Figure 13:
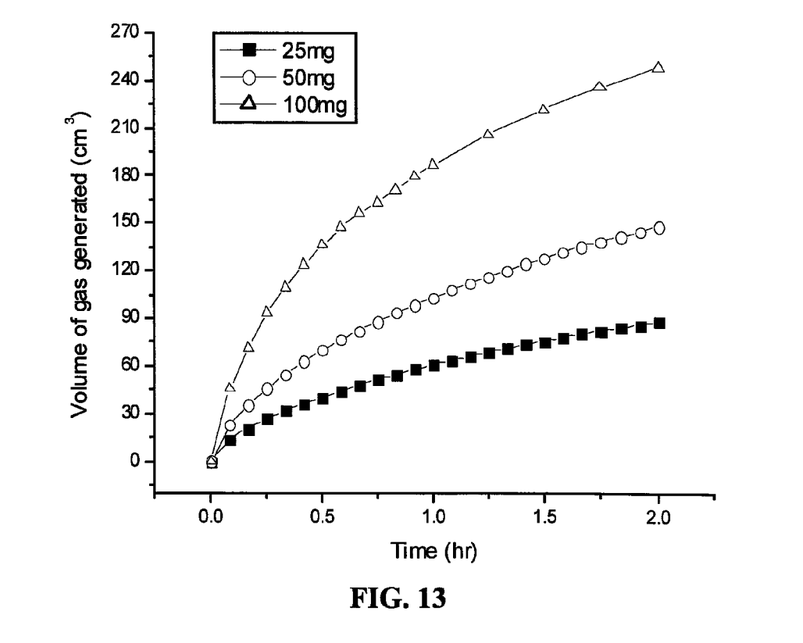
FIG. 13 is a plot of the gas volume evolved over time as a function of catalyst loading according to an embodiment of the invention.
Figure 14:
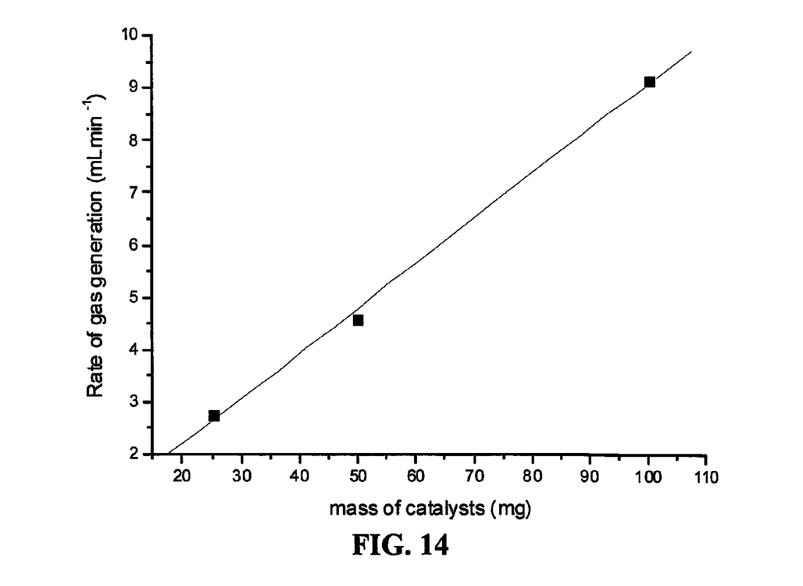
FIG. 14 is a plot of the initial rate of gas evolution as a function of catalyst loading according to an embodiment of the invention.

The rate of hydrogen generation was proportional to the amount of catalyst used. As can be seen in FIG. 13, the volume of gas generated over a 2 hour period and, as can be seen in FIG. 14, the initial rate of gas generation was linearly dependant on the different masses of a $Pt_2RuBi_4O_6$ catalyst employed at 40° C. for the dehydrogenation of a 15% v/v formic acid solution.

Example 5

Figure 15:
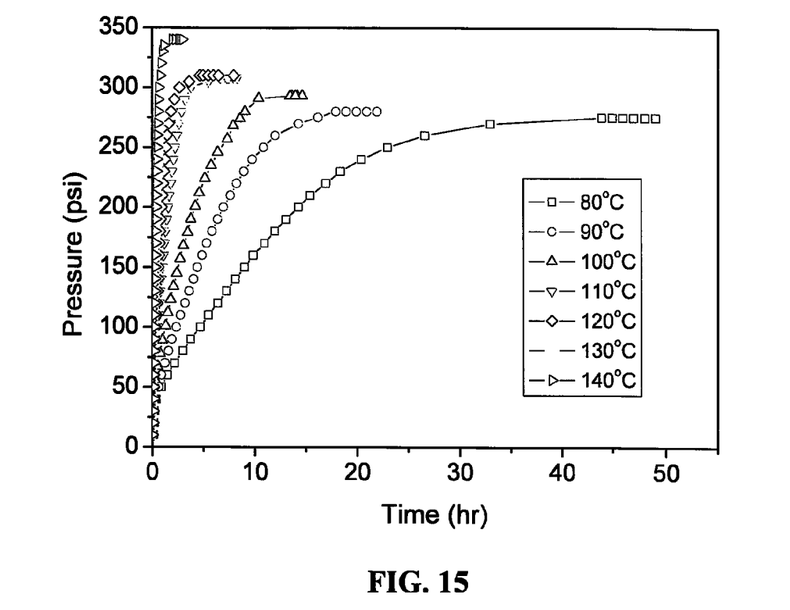
FIG. 15 is a plot of the pressure increase in a Parr reactor, a closed system, for the reaction of a 15% formic acid solution in the presence of $Pt/Ru/BiO_3$ at various temperatures according to an embodiment of the invention.
Figure 16:
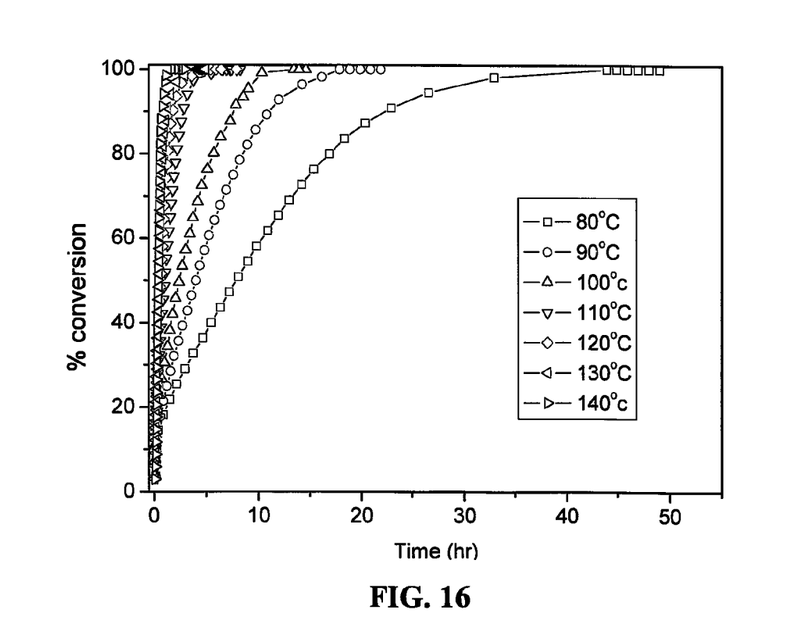
FIG. 16 is a plot the conversion of formic acid in a closed system at various temperatures according to an embodiment of the invention.

The reaction was studied in a closed system at elevated temperature using a 100 ml Parr reactor for the reaction of 10 ml of 15% v/v formic acid using 0.2 g of $Pt/Ru/BiO_x$ on carbon at room temperature in the autoclave of the reactor. The autoclave was heated externally to the target temperatures with feedback control. Pressure inside the autoclave was monitored from the time heating was commenced. Pressure increased with gas evolution. After pressure stabilization, the solution was removed and analyzed by titration with sodium hydroxide to determine the amounts of un-reacted formic acid. In all runs, more than 99.9% formic acid decomposition was observed. FIG. 15 shows the pressure profile of reactions run at various temperatures. The percent conversion over time, t, was calculated using the equation 4:

$$\% \text{ conversion} = \frac{\text{Pressure at time } t}{\text{Final pressure}} \times 100 \quad (4)$$

and plotted, as shown in FIG. 16, at various temperatures.

Example 6

Figure 17:
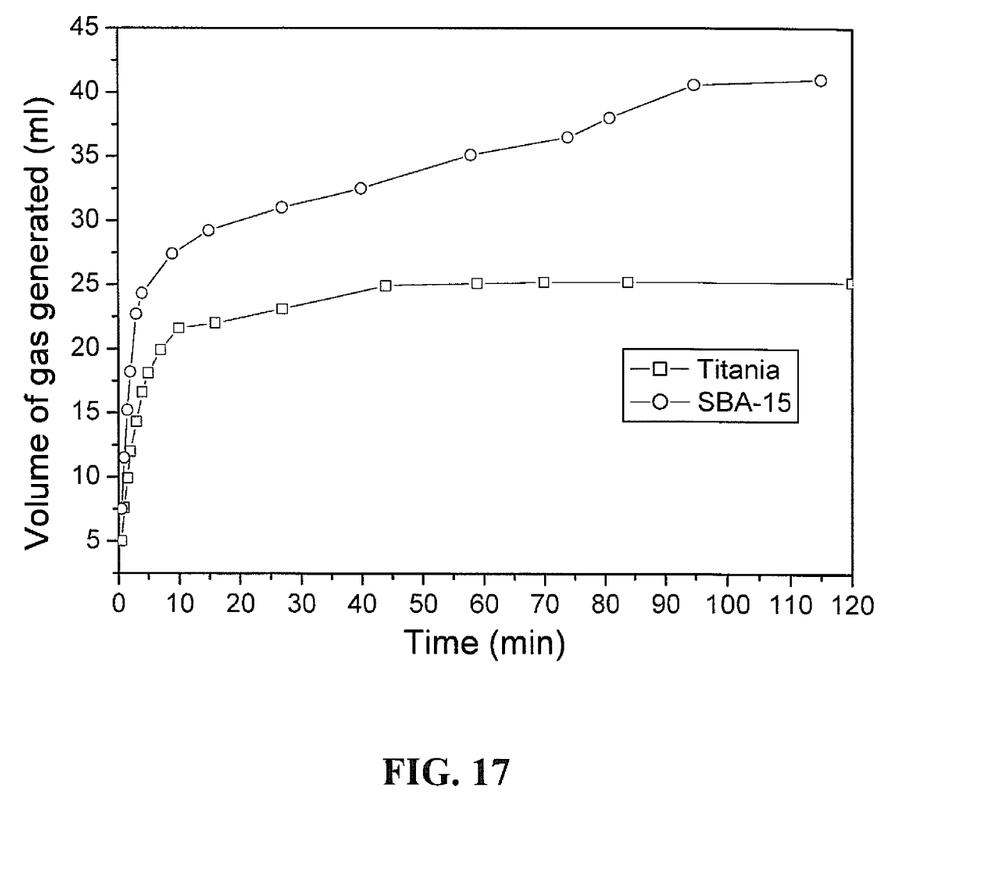
FIG. 17 shows a reaction profile for the formic acid decomposition in the presence of $Pt_aRu_bBi_cO_x$ loaded on titania and on mesoporous silica, SBA-15, according to an embodiment of the invention.

The catalyst activity on non-carbon supports was examined. The supported catalyst was prepared by generating the colloidal Pt/Ru, mixing the colloidal Pt/Ru with commercial $Bi_2O_3$, and substituting titania or mesoporous, SBA-15, for the carbon Vulcan XC 72 in the manner of example 1, above. The $Pt_aRu_bBi_cO_x$ loaded on titania or SBA-15 was collected by centrifugation, washed twice with water, and dried at 60° C. FIG. 17 is a plot of the formic acid decomposition catalyzed by $Pt_aRu_bBi_cO_x$ loaded on titania and SBA-15.

All patents, patent applications, provisional applications, and publications referred to or cited herein, supra or infra, are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

We claim:

1. A catalyst for the dehydrogenation of a small organic molecule in a liquid state, wherein said catalyst is $Pt_aRu_bBi_cO_x$ wherein a is 0.3 to 6.5, b is 1, c is 0.1 to 6.4, and x is 0.15 to 9.6.

2. The catalyst of claim 1, wherein said catalyst is in the form of a nanoparticle.

3. The catalyst of claim 2, wherein said catalyst further comprises a supporting material.

4. The catalyst of claim 3, wherein said supporting material comprises carbon, titania, alumina, or silica.

5. The catalyst of claim 3, wherein said supporting material comprises activated carbon, carbon black, carbon nanotubes, or carbon nanorods.

* * * * *

UNITED STATES PATENT AND TRADEMARK OFFICE
CERTIFICATE OF CORRECTION

PATENT NO.         : 8,754,000 B2
APPLICATION NO.    : 12/868481
DATED              : June 17, 2014
INVENTOR(S)        : Kwong Yu Chan et al.

Page 1 of 1

It is certified that error appears in the above-identified patent and that said Letters Patent is hereby corrected as shown below:

In the Specification

Column 1,
Line 22, "environmental" should read --environmentally--.
Line 31, "others" should read --other--.
Line 45, "temperature" should read --temperatures--.

Column 2,
Line 7, "addition" should read --additional--.

Column 3,
Line 17, "a aqueous" should read --an aqueous--.

Column 4,
Line 5, "is a plot the" should read --is a plot of the--.
Line 43, "a activated" should read --an activated--.

Column 6,
Line 30, "$H_2PtCl_6.6H_2O$" should read --$H_2PtCl_6 \cdot 6H_2O$--.
Line 37, "was as added" should read --was added--.

Column 7,
Line 24, "$Bi(NO_3)_3.5H_2O$" should read --$Bi(NO_3)_3 \cdot 5H_2O$--.
Line 47, "$Bi(NO_3)_3.5H_2O$" should read --$Bi(NO_3)_3 \cdot 5H_2O$--.
Line 48, "$H_2PtCl_6.6H_2O$" should read --$H_2PtCl_6 \cdot 6H_2O$--.
Lines 52-53, "was added and" should read --was added to--.
Line 56, "7a and 7b shows" should read --7a and 7b show--.

Column 8,
Line 33, "prepared as same" should read --prepared in the same--.

Signed and Sealed this
Twenty-first Day of April, 2015

Michelle K. Lee
*Director of the United States Patent and Trademark Office*